(12) United States Patent
Tian

(10) Patent No.: US 8,690,318 B2
(45) Date of Patent: Apr. 8, 2014

(54) GLASSES

(76) Inventor: Zhidong Tian, WenZhou (CN)

( * ) Notice: Subject to any disclaimer, the term of this patent is extended or adjusted under 35 U.S.C. 154(b) by 0 days.

(21) Appl. No.: 13/552,499

(22) Filed: Jul. 18, 2012

(65) Prior Publication Data

US 2013/0300998 A1    Nov. 14, 2013

(30) Foreign Application Priority Data

May 9, 2012    (CN) .......................... 2012 1 0143920

(51) Int. Cl.
*G02C 5/22* (2006.01)
*G02C 5/16* (2006.01)

(52) U.S. Cl.
CPC ... *G02C 5/22* (2013.01); *G02C 5/16* (2013.01)
USPC ........... 351/121; 351/153; 351/113; 351/114; 16/228

(58) Field of Classification Search
CPC .................................... G02C 5/22; G02C 5/16
USPC .................. 351/153, 113–114, 121
See application file for complete search history.

(56) References Cited

U.S. PATENT DOCUMENTS 6,619,798 B2 * 9/2003 Yue ............................... 351/113
7,775,658 B2 * 8/2010 Antoniacomi ............... 351/113

FOREIGN PATENT DOCUMENTS

CN    2470851 Y    1/2002
CN    201116953 Y    9/2008

OTHER PUBLICATIONS

Office action issued for Chinese Patent Application No. 201210143920.X dated Mar. 14, 2013, 6 pages.

* cited by examiner

*Primary Examiner* — Ricky Mack
*Assistant Examiner* — Daniele Manikeu
(74) *Attorney, Agent, or Firm* — Christie, Parker & Hale, LLP

(57) ABSTRACT

The present application provides glasses including a frame, temple bars and hinges connecting the temple bars with the frame. One end of each of the hinges is provided with a snap-in spring bow and the other end thereof is provided with a connecting hole hinged to the frame. Accordingly, each of the temple bars is provided with a snap groove cooperated with the snap-in spring bow of the hinge. When mounting the hinge, it only needs to insert the hinge into the temple bar such that the snap-in spring bow of the hinge is cooperated with the snap groove of the temple bar. Thus, in the glasses according to the present application, the hinge and the temple bar may be connected by a snap-fit connection instead of a soldering process or a screw connection, the connecting process is simple since neither a soldering process nor an additional screw is required.

3 Claims, 6 Drawing Sheets

GLASSES

This application claims the benefit of priority to Chinese patent application No. 201210143920.X titled "GLASSES", filed with Chinese State Intellectual Property Office on May 9, 2012. The entire disclosures thereof are incorporated herein by reference.

FIELD OF THE INVENTION

The present application relates to a technical field of glasses, in particular, to glasses having a simple and low cost process of connecting hinges to temple bars.

BACKGROUND OF THE INVENTION

The glasses are a simple optical device configured to correct vision or to protect eyes, and mainly includes a glasses bracket and lenses. The glasses bracket includes a frame for fixing the lenses, and temple bars (known as temple) hinged to the frame. In particular, the temple bars are hinged to the frame via hinges embedded in the temple bars.

The hinge in the prior art mainly includes a metal core and a spring bow. On the one hand, a turning process is required during the machining process due to the metallic material of the core, which is complicated to operate and has a high cost; on the other hand, the hinge after assembled is connected to the temple bars by welding, via a screw, or in other connection ways, which also has a high cost and a complicated connecting process.

Therefore, a problem to be solved by the person skilled in the art is to solve the problems of complicated process and high cost in connecting the hinges to the temple bars of the glasses.

SUMMARY OF THE INVENTION

The technical problem to be solved by the present application is to provide glasses which can solve the problems of complicated process and high cost in connecting the hinges to the temple bars of the glasses.

For realizing the above object, the present application provides glasses, including a frame, temple bars and hinges connecting the temple bars with the frame. One end of each of the hinges is provided with a snap-in spring bow and the other end thereof is provided with a connecting hole hinged to the frame. Each of the temple bars is provided with a snap groove cooperated with the snap-in spring bow of the hinge.

Preferably, in the above glasses, the hinges are plastic hinges.

Preferably, in the above glasses, each of the hinges includes:

a spring;

a core, one end of which being provided with a through hole for receiving the spring and the other end of which being provided with the connecting hole hinged to the frame; and a casing, one end of which being provided with the snap-in spring bow and the other end of which being provided with a recess for receiving the core, wherein a first protrusion for blocking the spring is provided in the recess, and the core is slideable in the recess.

Preferably, in the above glasses, a second protrusion configured to support the spring is further provided in the recess.

Compared with the prior art, the present application has the following technical effects:

The glasses according to the present application include a frame, temple bars and hinges connecting the temple bars with the frame. One end of each of the hinges is provided with a snap-in spring bow and the other end of each of the hinges is provided with a connecting hole hinged to the frame. Accordingly, each of the temple bars is provided with a snap groove cooperated with the snap-in spring bow of the hinge.

When mounting the hinge, it only needs to insert the hinge into the temple bar, such that the snap-in spring bow of the hinge is cooperated with the snap groove of the temple bar. Thus, in the glasses according to the present application, the hinge and the temple bar may be connected by a snap-fit connection instead of a soldering process or a screw connection, and the connecting process is simple since neither a soldering process nor an additional screw is required, thereby reducing the cost to a certain extent.

In a word, the glasses according to the present application can effectively solve the problems of complicated process and high cost in connecting the hinges to the temple bars of the glasses.

BRIEF DESCRIPTION OF THE DRAWINGS

For more clearly illustrating embodiments of the present application or the technical solution in the prior art, drawings referred to describe the embodiments or the prior art will be briefly described hereinafter. Apparently, the drawings in the following description are only several embodiments of the present application, and for the person skilled in the art other drawings may be obtained based on these drawings without any creative efforts.

REFERENCE NUMERALS IN THE FIGURES

1. frame; 2. temple bar; 3. hinge; 31. spring; 32. core; 321. through hole; 33. casing; 331. recess; 332. first protrusion; 333. second protrusion; 4. snap-in spring bow; 5. connecting hole.

DETAILED DESCRIPTION

It is provided according to the present application glasses which can effectively solve the problems of complicated process and high cost in connecting the hinges to the temple bars of the glasses.

For those skilled in the art to better understand the technical solutions of the present application, the present application will be described in detail in conjunction with drawings and embodiments hereinafter.

Figure 1:
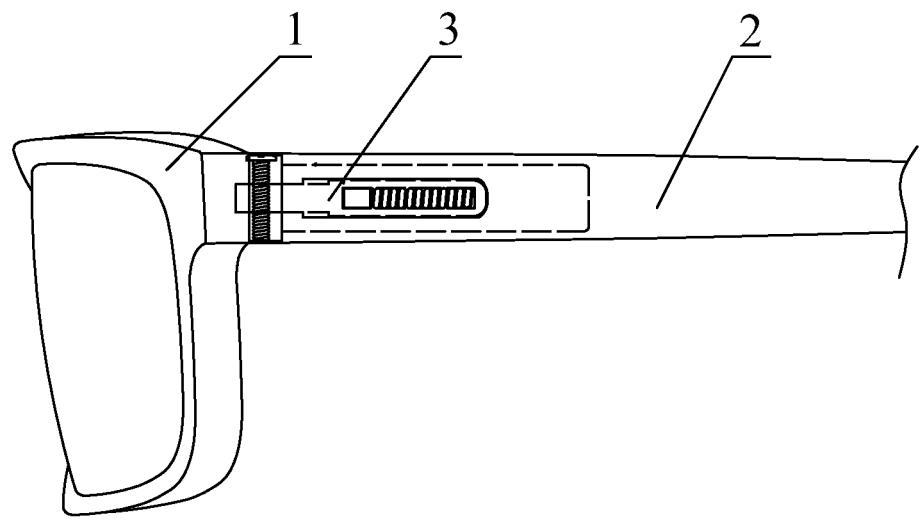
FIG. 1 is a schematic view of a partial structure of glasses according to the present application.
Figure 2:
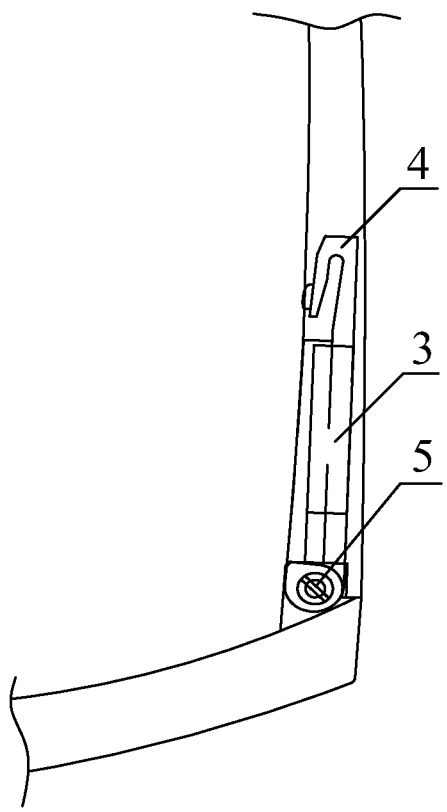
FIG. 2 is a schematic view of the structure of a hinge of the glasses according to the present application.

Reference is made to FIGS. 1 and 2. FIG. 1 is a schematic view of a partial structure of glasses according to the present application. FIG. 2 is a schematic view of the structure of a hinge of the glasses according to the present application.

The glasses according to the present application include a frame 1, temple bars 2, and hinges 3 connecting the temple bars 2 with the frame 1. One end of each of the hinges 3 is provided with a snap-in spring bow 4 and the other end of each of the hinges 3 is provided with a connecting hole 5 hinged to the frame 1. Accordingly, each of the temple bars 2 is provided with a snap groove cooperated with the snap-in spring bow 4 of the hinge 3.

When mounting the hinge 3, it only needs to insert the end of the hinge 3 provided with the snap-in spring bow 4 into the temple bar 2, so that the snap-in spring bow 4 of the hinge 3 is cooperated with the snap groove of the temple bar 2. Thus, in the glasses according to the present application, the hinge 3 and the temple bar 2 may be connected by a snap-fit connection, and the connecting process is simple since neither a soldering process nor an additional screw is required, thereby reducing the cost to a certain extent.

In a word, the glasses according to the present application can effectively solve problems of complicated process and high cost in connecting the hinges 3 to the temple bars 2 of the glasses.

According to the above technical solutions, the hinge 3 may be a metal hinge or a plastic hinge. Preferably, the hinge 3 is a plastic hinge, which, on the one hand, is easier to be formed and has a longer service life, and on the other hand, can further reduce the cost.

Figure 3:
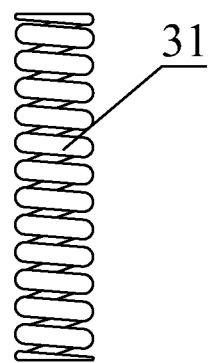
FIG. 3 is a schematic view of the structure of a spring of the hinge.
Figure 4:
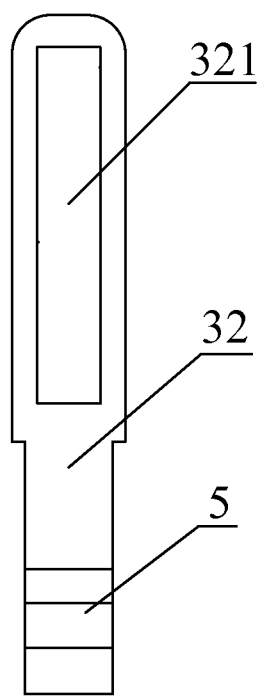
FIG. 4 is a schematic view of the structure of a core of the hinge.
Figure 5:
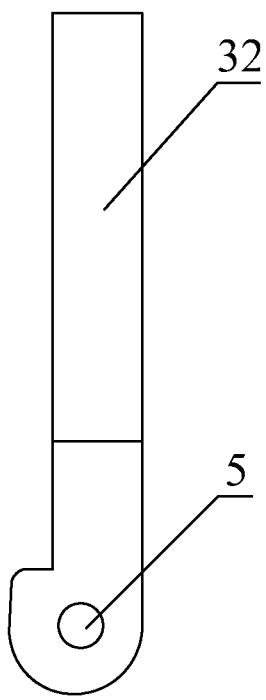
FIG. 5 is a side view of the core shown in FIG. 4.
Figure 6:
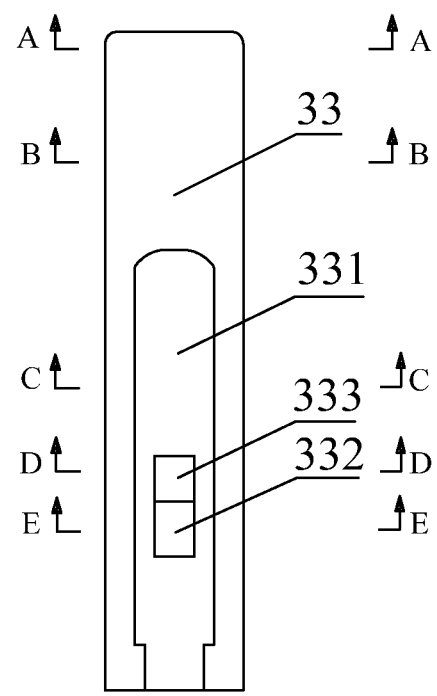
FIG. 6 is a schematic view of the structure of a casing of the hinge.
Figure 7:
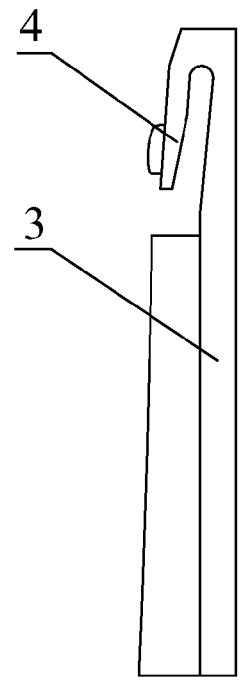
FIG. 7 is a side view of the casing shown in FIG. 6.
Figure 8:
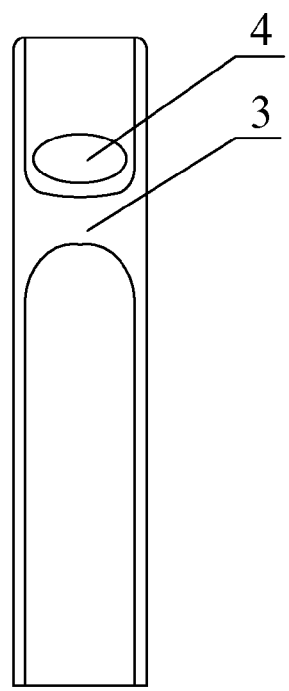
FIG. 8 is a rear view of the casing shown in FIG. 6.
Figure 9:
FIG. 9 is a sectional view taken along line A-A of FIG. 6.
Figure 10:
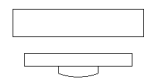
FIG. 10 is a sectional view taken along line B-B of FIG. 6.
Figure 11:
FIG. 11 is a sectional view taken along line C-C of FIG. 6.
Figure 12:
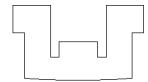
FIG. 12 is a sectional view taken along line D-D of FIG. 6.
Figure 13:
FIG. 13 is a sectional view taken along line E-E of FIG. 6.

Reference is made to FIGS. 3 to 15. FIG. 3 is a schematic view of the structure of a spring of the hinge. FIG. 4 is a schematic view of the structure of a core of the hinge. FIG. 5 is a side view of the core shown in FIG. 4. FIG. 6 is a schematic view of the structure of a casing of the hinge. FIG. 7 is a side view of the casing shown in FIG. 6. FIG. 8 is a rear view of the casing shown in FIG. 6. FIG. 9 is a sectional view taken along line A-A of FIG. 6. FIG. 10 is a sectional view taken along line B-B of FIG. 6. FIG. 11 is a sectional view taken along line C-C of FIG. 6. FIG. 12 is a sectional view taken along line D-D of FIG. 6. FIG. 13 is a sectional view taken along line E-E of FIG. 6.

The above hinge 3 is of an integral structure. In order to further improve the above technical solutions, according to the present application, the hinge 3 is assembled from three parts, i.e., a spring 31, a core 32 and a casing 33. One end of the core 32 is provided with a through hole 321 for receiving the spring 31 and the other end of the core 32 is provided with a connecting hole 5 hinged to the frame 1. One end of the casing 33 is provided with a snap-in spring bow and the other end of the casing 33 is provided with a recess 331 for receiving the core 32. A first protrusion 332 for blocking the spring is provided in the recess 331, and the core 32 is slideable in the recess 331.

In particular, FIGS. 9 to 13 are sectional views of several cross sections of the casing 33, which clearly illustrate the spatial structure of the recess 331 provided in the casing 33.

Figure 14:
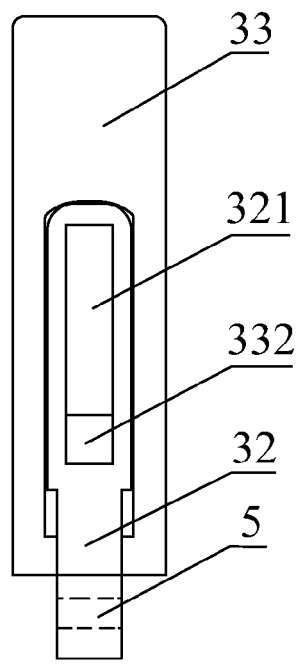
FIG. 14 is a schematic view of the structure of the hinge when assembling the core in FIG. 4 in the casing in FIG. 6.
Figure 15:
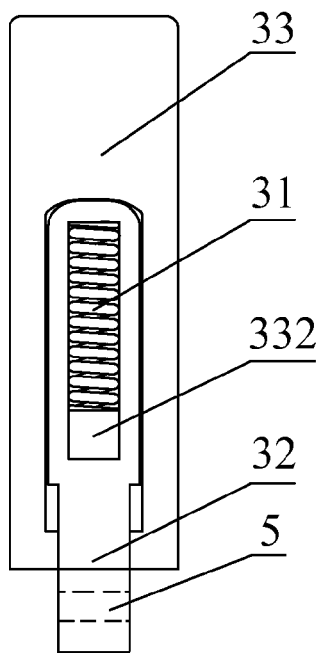
FIG. 15 is a schematic view of the structure of the hinge when assembling the spring in FIG. 3 in a through hole of the core in FIG. 14.

Reference is made to FIGS. 14 and 15. FIG. 14 is a schematic view of the structure of the hinge when assembling the core in FIG. 4 in the casing in FIG. 6. FIG. 15 is a schematic view of the structure of the hinge when assembling the spring in FIG. 3 in a through hole of the core in FIG. 14.

As shown in FIG. 14, during the assembling process, firstly, the core 32 is placed in the recess 331 of the casing 33, and the first protrusion 332 of the recess 331 passes through the through hole 321 of the core 32. As shown in FIG. 15, after the core 32 is mounted in the casing 33, the spring 31 is compressed and is placed in the through hole 321 of the core 32, such that one end of the spring 31 abuts against an upper end of the through hole 321 and the other end of the spring 31 abuts against the first protrusion 332, and then the core 32 is pressed against a top end of the recess 331 of the casing 33 under the elastic force of the spring 31. Thus the assembling of the hinge 3 is finished. When connecting the hinge 3 to the temple bar 2, it only needs to insert the end of the casing 33 with the snap-in spring bow 4 in the temple bar 2 such that the snap-in spring bow 4 is cooperated with the snap groove of the temple bar 2, and then the hinge 3 is connected to the frame 1 via the connecting hole at one end of the core 32.

The core 32 is slideable in the recess 331 of the casing 33. If the core 32 is moved downwardly under an external force, the spring 31 is further compressed by the core 32. If the external force is removed, the core 32 returns to an original position under the elastic force of the spring 31. Because of the structural design of the hinge 3 of the glasses according to the present application, the temple bars 2 of the glasses may elastically slide with respect to the frame 1. It is well known that different people may have different face contours, and glasses suitable for some people may be tight for some other people. Because of the special structure of the hinge of the glasses according to the present application, the temple bars 2 may elastically slide relative to the frame 1, thereby greatly increasing the suitable group of the glasses, that is the applicability is improved.

On the other hand, because of the structural design of the hinge, the temple bars 2 of the glasses may have an elastic force when unfolding or folding, such that the glasses may be unfolded or folded easily.

Due to a small radius of a cross section of the spring 31, the spring 31 falls into the recess 331 of the casing 33 after being placed in the through hole 321 of the core 32, with a side of the spring 31 abutting on an inner wall of the recess 331 of the casing 33. Thus frictions may occur during the compressing and stretching process of the spring 31, which will affect the elastic effect of the spring 31. In view of this, a second protrusion 333 configured to support the spring 31 is further provided in the recess 331 according to the present application. After being placed in the through hole 321, the spring 31 is supported by the second protrusion 333 and keeps a certain distance from the inner wall of the casing 33.

The glasses according to the present application are described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the protection scope of the present application defined by the claims.

What is claimed is:

1. Glasses comprising a frame, temple bars and hinges connecting the temple bars with the frame, wherein one end of each of the hinges is provided with a snap-in spring bow and the other end of each of the hinges is provided with a connecting hole hinged to the frame, and each of the temple bars is provided with a snap groove cooperated with the snap-in spring bow of the hinge, and each of the hinges comprises:

a spring;

a core, one end of which being provided with a through hole for receiving the spring and the other end of which being provided with the connecting hole hinged to the frame; and a casing, one end of which being provided with the snap-in spring bow and the other end of which being provided with a recess for receiving the core, wherein a first protrusion for blocking the spring is provided in the recess, and the core is slideable in the recess.

2. The glasses according to claim 1, wherein the hinges are plastic hinges.

3. The glasses according to claim 1, wherein a second protrusion configured to support the spring is further provided in the recess.

\* \* \* \* \*